United States Patent [19]
Gillett et al.

[11] Patent Number: 5,741,605
[45] Date of Patent: Apr. 21, 1998

[54] SOLID OXIDE FUEL CELL GENERATOR WITH REMOVABLE MODULAR FUEL CELL STACK CONFIGURATIONS

[75] Inventors: James E. Gillett, Greensburg; Jeffrey T. Dederer, Valencia; Paolo R. Zafred; Jeffrey C. Collie, both of Pittsburgh, all of Pa.

[73] Assignee: Westinghouse Electric Corporation, Pittsburgh, Pa.

[21] Appl. No.: 613,399

[22] Filed: Mar. 8, 1996

[51] Int. Cl.$^6$ ................................................ H01M 8/10
[52] U.S. Cl. ................................................ 429/31; 429/34
[58] Field of Search ........................................ 429/34, 31

[56] References Cited

U.S. PATENT DOCUMENTS

| | | | |
|---|---|---|---|
| 4,395,468 | 7/1983 | Isenberg | 429/31 |
| 4,476,196 | 10/1984 | Poeppel et al. | 429/32 |
| 4,490,444 | 12/1984 | Isenberg | 429/31 |
| 4,548,875 | 10/1985 | Lance | 429/26 |
| 4,751,152 | 6/1988 | Zymboly | 429/31 |
| 4,808,491 | 2/1989 | Reichner | 429/13 |
| 4,874,678 | 10/1989 | Reichner | 429/30 |
| 4,876,163 | 10/1989 | Reichner | 429/30 |
| 5,082,751 | 1/1992 | Reichner | 429/19 |
| 5,143,800 | 9/1992 | George et al. | 429/20 |
| 5,169,730 | 12/1992 | Reichner et al. | 429/20 |
| 5,413,879 | 5/1995 | Domeracki et al. | 429/30 |
| 5,573,867 | 11/1996 | Zafred | 429/17 |

FOREIGN PATENT DOCUMENTS

| | | | |
|---|---|---|---|
| 63 037573 | 7/1986 | Japan | H01M 8/24 |
| 01 130476 | 11/1987 | Japan | H01M 8/24 |

*Primary Examiner*—John S. Maples

[57] ABSTRACT

A high temperature solid oxide fuel cell generator produces electrical power from oxidation of hydrocarbon fuel gases such as natural gas, or conditioned fuel gases, such as carbon monoxide or hydrogen, with oxidant gases, such as air or oxygen. This electrochemical reaction occurs in a plurality of electrically connected solid oxide fuel cells bundled and arrayed in a unitary modular fuel cell stack disposed in a compartment in the generator container. The use of a unitary modular fuel cell stack in a generator is similar in concept to that of a removable battery. The fuel cell stack is provided in a pre-assembled self-supporting configuration where the fuel cells are mounted to a common structural base having surrounding side walls defining a chamber. Associated generator equipment may also be mounted to the fuel cell stack configuration to be integral therewith, such as a fuel and oxidant supply and distribution systems, fuel reformation systems, fuel cell support systems, combustion, exhaust and spent fuel recirculation systems, and the like. The pre-assembled self-supporting fuel cell stack arrangement allows for easier assembly, installation, maintenance, better structural support and longer life of the fuel cells contained in the fuel cell stack.

23 Claims, 8 Drawing Sheets

SOLID OXIDE FUEL CELL GENERATOR WITH REMOVABLE MODULAR FUEL CELL STACK CONFIGURATIONS

GOVERNMENT CONTRACT

The Government of the United States of America has rights in this invention pursuant to Contract No. DE-FC21-91MC28055, awarded by the United States Department of Energy.

FIELD OF THE INVENTION

This invention relates to electrochemical electric power generators, such as solid oxide fuel cell generators, and more particularly concerns self-supporting removable modular fuel cell stack configurations for solid oxide fuel cell generators. According to the invention the stack is structured such that it can be assembled outside the generator casing as well as inside, for facilitating assembly, installation, removal and maintenance of the fuel cell stack. Furthermore, when installed the removable modular stack is characterized by greater internal structural support than in a conventional arrangement, and thus is suitable for multi-hundred kilowatt and multi-megawatt generators.

BACKGROUND OF THE INVENTION

High temperature solid oxide fuel cell based electrical power generators ("generators") are known generally, and can comprise a plurality of elongated solid oxide fuel cells ("SOFC"s) that are electrically connected in a series/parallel configuration and are surrounded by thermal insulation and disposed in a housing. Examples of tubular SOFCs and generators containing them are taught, for example, by U.S. Pat. Nos. 4,395,468 (Isenberg), 4,490,444 (Isenberg), and the publication "Solid Oxide Fuel Cell," Westinghouse Electric Corporation, October 1992. U.S. Pat. No. 4,476,196 (Poppel, et al.) teaches flat plate SOFCs and generators; U.S. Pat. No. 4,476,198 (Ackerman, et al.) teaches corrugated SOFCs, etc. These disclosures are hereby incorporated in their entireties.

A tubular type SOFC can comprise an open-ended or closed-ended elongated tube of porous ceramic air electrode material (the cathode), such as lanthanum manganite doped with calcium. The electrode can be self-supporting or optionally deposited on a ceramic support tube. The air electrode tube is substantially covered by a dense, gas-tight, thin film ceramic solid oxide electrolyte material, such as yttria-stabilized zirconia. The surface of the electrolyte is substantially covered by a porous cermet fuel electrode material (the anode), such as nickel-zirconia cermet. The electrolyte and the fuel electrode both are discontinuous at a selected radial portion along their length, usually along the entire active length of the fuel cell, and at this discontinuity a dense, gas-tight, thin interconnection material is provided, such as lanthanum chromite doped with calcium. The interconnection material is usually covered by an electrically conductive top layer, such as nickel-zirconia cermet, to provide an area for electrical connections among adjacent fuel cells.

A flat plate type SOFC array can comprise flat array of cells having electrolyte walls and interconnect walls. The electrolyte walls contain thin, flat layers of cathode and anode materials sandwiching the electrolyte. A corrugated plate type SOFC array can comprise triangular or corrugated honeycomb active anode, cathode, electrolyte and interconnect materials. Fuel cells not having a solid electrolyte, such as molten carbonate fuel cells, are also possible. Generators using any of these particular fuel cell designs may be constructed utilizing the removable modular fuel cell stack configurations according to this invention.

High temperature, solid oxide fuel cell generators, e.g. with tubular type fuel cells, have a gas-tight thermally insulated generator housing surrounding individual thermally insulated chambers, including a generator chamber and a combustion chamber. The generator chamber houses a fuel cell stack configuration which includes a plurality of elongated, generally tubular annular solid oxide fuel cells, electrically connected in series and parallel. The cells are physically arrayed with their axes parallel to one another in a rectangular or circular grouping. For example in a rectangular configuration, each fuel cell is electrically connected in series with an adjacent cell in a column, through cell connections extending the axial length of each cell. This series interconnection couples the air electrode of one cell and the fuel electrode of an adjacent cell, namely through a metallic coating and a fiber metal felt, so as to sum their generated voltages. The fuel cells or series-connected groups of cells can be electrically connected in parallel with an adjacent cell or group, e.g., in a row, through cell interconnections likewise extending the axial length of each cell. In this fashion the configuration of the fuel cells can be arranged to meet the desired voltage and current requirements for a given application, due to the series and parallel connections, respectively.

Conventionally, fuel cell stacks in SOFC generators comprise a number of individual components that are assembled in the casing and not provided as a preassembled self-supporting arrangement. The fuel cell stack structure comprises various structures for supporting the array of solid oxide fuel cells, for fuel supply, exhaust, electrical connections and the like, mounted in the generator container. To build the generator, each component must be mounted and connected individually. For example, each fuel cell in the stack is individually placed and electrically connected into the circuit when installed, including placing and soldering metal felts and lead wires, and individually mounting the required and generally complicated arrangement of brackets, fittings, piping, bellows, and related generator parts and assemblies. The various parts may include, for example, fuel cell support blocks, fuel cell divider boards, fuel supply tubing, fuel pre-conditioners (i.e., fuel reformers), fuel distribution boards, air supply tubing, air distribution tubing, exhaust tubing, recirculation tubing, power leads and the like.

The lack of a self-supporting structure, particularly for the elongated fuel cells in the stack, results in a great amount of handling and difficulty to install the fuel cells in the generator chamber. This leads to fuel cell damage during assembly and consequential risk of fuel cell stack malfunctioning, as well as substantial assembly costs.

The basic structural requirements of fuel-efficient solid oxide fuel cell generator design have been established through field tests and engineering studies. Scaled-up generators capable of multi-hundred kW and multi-MW commercial SOFC generators are planned, for example, from Westinghouse Electric Corporation, for practical applications in the near future. However, efficiencies with respect to assembly costs and reliability are needed. Individual generator modules capable, for example, of 200 kW would be advantageous for on-site cogeneration applications. Individual SOFC generator modules can be arranged in power blocks. Any number of power blocks can be installed to satisfy given requirements for large power plants.

However, scaling up the generation capacity of an SOFC generator generally involves using more numerous and/or more densely mounted cells. Existing SOFC generator designs have the drawback that the fuel cell stack and associated stack components must be installed and assembled directly within the generator, which is further aggravated in larger units. The generator must be large enough to allow clearance within the generator housing to permit manual assembly of the fuel cell stack and the associated stack components. After assembly, spaces within the generator housing may be filled with thermal insulation to prevent excess heat loss from the generator, thus further minimizing clearance for manual operations in the event that repair and maintenance are needed later.

With increase of the generator size and capacity, the elongated fuel cell stacks generally are provided with less support than in smaller units. The auxiliary components such as fuel and air distribution piping, associated bellows, and power leads likewise lack comparable self-support as the size of the generator increases to commercial dimensions. This increases the risk of fuel cell breakage and stack malfunction, due to self imposed handling loads, the need for extensive fixtures to facilitate handling and assembly of the fuel cell stack, removal of temporary support or handling fixtures after mounting or assembly, etc. Replacement or repair of the fuel cell stack and its individual fuel cells is inherently impractical in a conventional generator, since the fuel cell stack must be disassembled directly from within the generator housing to permit replacement or repair. The time and expense of performing such replacements or repairs is economically impractical at best and can be cost prohibitive in commercial applications.

What is needed is a more efficient and cost effective solid oxide fuel cell generator with respect to techniques of assembly and disassembly. According to the present invention, a pre-assembled self-supporting removable fuel cell stack module provides easier and more efficient assembly, to facilitate building, installation and maintenance of the solid oxide fuel cell stack. The self-supporting modular design of the SOFC generator decreases the potential for fuel cell breakage and stack malfunction due to inherent loads on stack components, and due to handling steps and the placement and removal of extensive fixtures for the assembly of fuel cell stacks, whether permanent or requiring ultimate removal before completion of the assembly. The SOFC generator design allows for easier and more efficient replacement of fuel cell stacks and/or stack components without the need for extended periods of generator downtime.

Accordingly, the present invention provides a solid oxide fuel cell generator with a removable, structurally self-supporting, fuel cell stack assemblage that allows for substantially complete assembly of the solid oxide fuel cell stack as a unit, outside of the generator container on a structural common stack base. The self-supporting structural fuel cell stack assembly includes the fuel cell stack array and may also include related components, such as the fuel pre-conditioner system, fuel distribution system, air distribution system, and other auxiliary equipment, likewise carried on the structural assemblage. In this way, access from all sides can be had to the internal components of the solid oxide fuel cell stack during assembly and prior to installation in a substantially integrally closed generator container. Moreover, vertical positioning of the fuel cells can be accomplished during external assembly steps outside of the generator which avoids imposing loads on the fuel cells and other equipment which would otherwise occur.

The invention significantly reduces the risk of fuel cell breakage and other damage during assembly. The invention allows the use of a smaller generator container than would otherwise be needed, which can reduce heat losses because extra room in the generator container need not be reserved to permit access to components when in the container. Fewer fixtures and fittings are needed to aid in assembly. The unitary fuel cell stack assembly allows for easy installation, removal and handling and access to the entire fuel cell stack. This makes it possible to easily repair and replace the solid oxide fuel cell stack when needed without significant generator downtime. Thus, an old fuel cell stack can be removed as a unit from the generator chamber and housing, and replaced with a fresh and efficient modular stack having new or reconditioned fuel cells. Likewise, the stack is made easily accessible from all sides for routine maintenance by removal from the generator.

SUMMARY OF THE INVENTION

It is an object of the invention to provide a solid oxide fuel cell generator in which the fuel cell stack is assembled on a common stack base forming a structurally unitary self-supporting and removable assembly which can be easily built, handled, installed, and removed from the generator.

It is another object of the invention to provide a removable modular fuel cell stack as described, containing a plurality of electrically connected solid oxide fuel cells arrayed on a common structural base.

It is yet another object of the invention to provide means on the unitary removable modular assembly for supporting other components in addition to the solid oxide fuel cells, including for example a fuel pre-conditioner, fuel cell stack pre-conditioner, fuel supply system, fuel distribution system, air supply system, air distribution system, exhaust system, power leads, and other related generator components.

It is yet another object of the invention to provide a structural, self-supporting, removable modular fuel cell stack that is operational in either an atmospheric or a pressurized (i.e., operating above atmospheric pressures in a pressure vessel) solid oxide fuel cell generator.

It is still another object of the invention to provide a solid oxide fuel cell generator container including a generator housing having a fuel cell stack compartment therein capable of receiving a removable modular fuel cell stack, and further having other generator components including a fuel pre-conditioner, fuel cell stack pre-conditioner, fuel supply system, fuel distribution system, air supply system, air distribution system and power leads, optionally integrally associated with the removal modular fuel cell stack, thereby forming a unitary assemblage.

It is a further object of the invention to provide a solid oxide fuel cell generator container including multiple compartments containing multiple structural, self-supporting, removable modular fuel stacks positioned therein, for example to facilitate scaled up generator capacities, increased cell densities and the like.

It is an advantage of the invention to allow assembly of the solid oxide fuel cell stack outside of the generator container, thereby allowing access to the stack from all sides during assembly.

It is another advantage of the invention to allow final positioning of the pre-assembled solid oxide fuel cell stack into the generator container while minimizing potentially destructive loads on the individual fuel cells and optional other equipment which may occur during alternative assembly operations and/or maintenance steps. This is significant because fuel cell stacks of commercial size may not be self-supporting or impact resistant in all orientations. Furthermore, optional auxiliary components such as fuel and air distribution piping, associated bellows, and power leads are equally lacking in self support. Accordingly, under pre-existing generator designs, as the size of the fuel cell stacks and auxiliary components increase to satisfy commercial demands, there will be a commensurate increase in the potential for cell breakage, the likelihood of stack malfunction due to self-imposed handling loads, and the need for extensive handling fixtures for assembly of the fuel cell stack that must ultimately be removed before completion of the assembly.

It is yet another advantage of the invention to allow for more compact generator designs by eliminating the need to reserve void space for access to components from a particular direction such as the top of the generator casing, and thereby to reduce heat loss and requirements to fill voids with thermal insulation, and generally to reduce generator size. The stack compartment in the container need only be large enough to provide clearance for inserting the removable modular fuel cell stack as a unit. Thus, the generator design of the invention requires less insulation and plant floor space than known generator designs.

It is still another advantage of the invention to allow for easy access to the fuel cell stack for routine maintenance and repair. Under the invention, the removable modular stack can be removed from the generator container facilitating access to the solid oxide fuel cell stack from all directions to allow for easier maintenance and repair of the fuel cells and related components.

It is also another advantage of the invention to decrease the downtime needed to repair or replace the solid oxide fuel cells and related components. Under the invention, when the fuel cell stack needs to be replaced the old removable modular stack can simply be removed from the generator container and replaced with a new one. Thus, significantly reducing the downtime associated with existing systems where the fuel cell stack and associated equipment must be disassembled and reassembled within the generator container.

A first aspect of the invention resides in a fuel cell generator characterized by: a generator housing with a generator compartment (or fuel cell stack compartment) therein and a structurally unitary, pre-assembled, self-supporting, removable modular fuel cell stack positioned in the generator compartment, in which the removable modular fuel cell stack structural assembly is characterized by: a structural base and a plurality of electrically connected, axially elongated, tubular fuel cells arrayed on the base, and also including associated optional equipment, such as a fuel pre-conditioner (reformer), a fuel cell stack pre-conditioner (reformer), a fuel distribution system, an air distribution system, power leads, a combustion system, an air inlet system, a fuel inlet system, a spent fuel recirculation system, an exhaust system, etc., attached directly or indirectly to either the base or the fuel cells arrayed on the base forming a unitary self-supporting and removable fuel cell stack assembly.

More specifically, this first aspect of the invention resides in a fuel cell generator characterized by: a unitary self-supporting fuel cell stack assembly with the fuel cells and certain associated equipment for a fuel cell generator, all being installed on a common base to form a removable assembly disposed within a generator housing in a fuel cell stack compartment for receiving said removable modular fuel cell stack.

A second aspect of the invention resides in a solid oxide fuel cell generator characterized by: a generator housing with a fuel cell stack compartment therein for receiving a pre-assembled self-supporting removable modular solid oxide fuel cell stack said stack, in which the stack is characterized by: a solid oxide fuel cell stack comprising a plurality of electrically connected fuel cells containing electrodes (anode and cathode) disposed between electrolytes mounted on a common base, in which the fuel cells are preferably tubular, axially elongated, high temperature, solid oxide fuel cells, each fuel cell including an inner air electrode (cathode) having its interior in communication with an air supply, a solid oxide electrolyte substantially surrounding the outer periphery of the air electrode, and an outer fuel electrode (anode) substantially surrounding the outer periphery of the solid oxide electrolyte having its exterior in communication with a fuel supply, the solid oxide electrolyte and fuel electrode being discontinuous in a selected portion along the length, and in the discontinuity is an interconnection on the air electrode for electrical interconnection between adjacent fuel cells, and the removable modular fuel cell stack optionally further is characterized by: associated generator equipment including, without limitation, a fuel pre-conditioner, a fuel cell stack pre-conditioner, a fuel supply system, a fuel distribution system, an air supply system, an air distribution system, power leads, a combustion chamber, a spent fuel recirculation system, an exhaust system, either mounted directly or indirectly on the common stack base.

This second aspect of the invention resides in a solid oxide fuel cell generator characterized by: a pre-assembled, self-supporting structural assembly with the fuel cell stack installed on a common base to form a unitary removable modular fuel cell stack assembly and a generator container with a stack compartment for receiving the removable modular fuel cell stack and certain associated equipment for a solid oxide fuel cell generator, either installed integrally with the removable self-supporting fuel cell stack assembly or associated separately with the generator container.

BRIEF DESCRIPTION OF THE DRAWINGS

The invention will become more readily apparent from the following description of preferred embodiments thereof shown, by way of example only, in the accompanying drawings, wherein.

DETAILED DESCRIPTION OF THE PREFERRED EMBODIMENTS OF THE INVENTION

Figure 1:
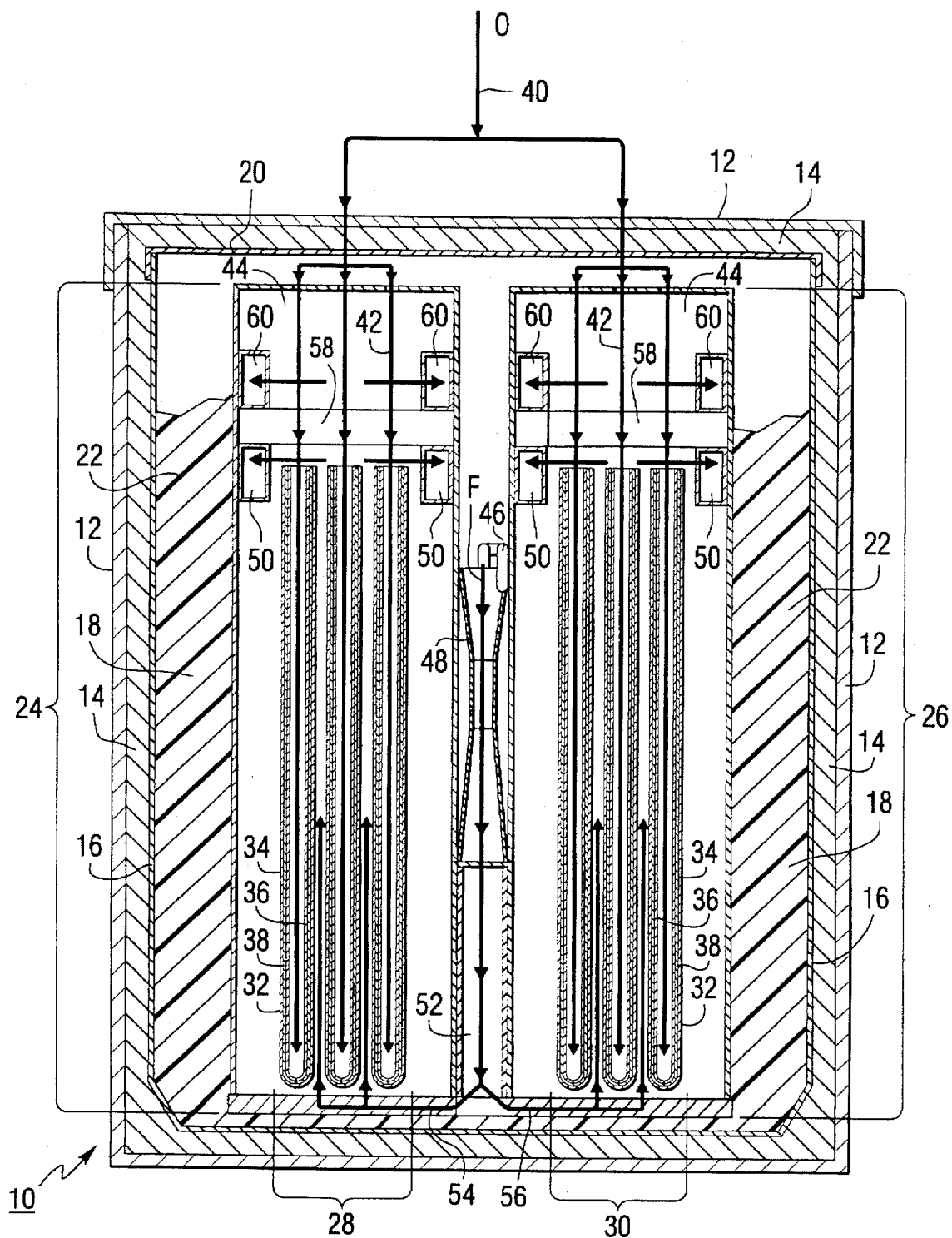
FIG. 1 is a side view in section of one embodiment of an electrochemical cell generator according to the invention, such as a high temperature solid oxide fuel cell generator, the drawing showing a removable modular fuel cell stack positioned in the generator container.

A high temperature, solid oxide fuel cell generator includes a gas-tight thermally insulated generator housing surrounding individual thermally insulated chambers including, without limitation, a generator chamber and a combustion chamber. The generator chamber, in which power generation occurs, comprises a solid oxide fuel cell stack containing a plurality of typically-tubular axially elongated electrically connected solid oxide fuel cells made of ceramic electrodes and electrolytes, along with certain associated fuel and oxidant supply and distribution equipment. As discussed above, the fuel cells in a fuel cell generator can be solid oxide electrolyte or molten carbonate electrolyte fuel cells of any type or configuration. However, for purposes of simplicity and without limitation, tubular solid oxide electrolyte fuel cells will be discussed as an exemplary type useful in this invention, and the following description hereinafter will generally relate to that type. It will be appreciated, however, that the invention is equally applicable to other types of cells.

High temperature solid oxide fuel cell generators are highly efficient in the conversion of chemical energy, generally in the form of gaseous hydrocarbons and air, into electric power. They can operate at slightly above atmospheric pressure or in a "pressurized" mode at elevated pressures of up to about 220 psi (about 15 atmospheres), usually from about 135 psi (about 9 atmospheres) up to about 220 psi. The solid oxide fuel cell generators operate at temperatures typically over about 650° C., usually from about 650° C. up to about 1,250° C., to produce electricity from any of a variety of fossil fuels. Examples include coal-derived fuel gas, natural gas primarily comprising methane, or distillate fuel, or conditioned fuel, such as hydrogen gas or carbon monoxide gas, all which react electrochemically with air or oxygen gas to oxidize the fuel gas and generate a flow of electrons to produce electrical current for powering an external circuit. The temperature of the exhaust gases from the solid oxide fuel cell generators is between 500° C. and 850° C., a temperature which is attractive for cogeneration applications or for use in bottoming cycles for all-electric central station power plants.

Each solid oxide fuel cell positioned in the generator readily conducts oxygen ions contained in the oxidant gas, such as air or oxygen ($O_2$), from an air electrode (the cathode), where they are formed, through a solid oxide electrolyte to a fuel electrode (the anode). There the oxygen ions react with carbon monoxide (CO) and hydrogen ($H_2$) gas contained in the fuel gas to deliver electrons and produce electricity. The tubular solid oxide fuel cell design features a tubular, axially elongated (approximately 50 to 230 cm long) porous air electrode, preferably self-supporting, made of a doped perovskite ceramic material, for example, lanthanum manganite doped with calcium, strontium or cerium (approximately 1 to 3 mm thick). A thin, dense, gas-tight solid oxide electrolyte made of a ceramic material, for example, yttria-stabilized zirconia (approximately 0.001 to 0.1 mm thick) covers most of the outer periphery of the air electrode, except in a radial strip (approximately 9 mm wide) typically extending along the entire active cell length. This strip of exposed air electrode is covered by a thin, dense, gas-tight layer of an electrical interconnection ceramic material, for example, lanthanum chromite doped with calcium or strontium (approximately 0.03 to 0.1 mm thick), roughly similar in thickness to the solid electrolyte. This layer, termed the cell interconnection, serves as the electric contact area and is coupled by a conductor to an adjacent cell or to a power output contact. A porous fuel electrode made of a cermet material, for example, nickel-zirconia cermet, covers the outer periphery of the solid electrolyte surface (approximately 0.03 to 0.1 mm thick), except in the vicinity of the interconnection, both the solid electrolyte and fuel electrode being spaced apart from the interconnection to avoid direct electrical communication. An electrically conductive separate top layer of cermet material, for example nickel-zirconia cermet, also covers the outer periphery of the interconnection (approximately 0.03 to 0.1 mm thick), roughly similar in thickness to the fuel electrode. An optional porous calcia-stabilized zirconia support for the supporting the inner periphery of the air electrode can also be used, if necessary, to better support the air electrode structurally. For a detailed description of exemplary materials and construction details of a tubular solid oxide fuel cell and a high temperature, solid oxide fuel cell generator of the tubular configuration, reference can be made to U.S. Pat. No. 4,490,444 (Isenberg), which is hereby incorporated in its entirety.

For operation, air or oxygen, typically air, is introduced into the annulus of the tubular solid oxide fuel cell, typically through an air injector tube extending within the annulus to near the bottom of the fuel cell tube, being preheated to approximately 1,000° C. The air, discharged near the closed end bottom of the fuel cell, reverses direction and flows up through the annular space formed by the inside of the air electrode of the fuel cell and its coaxial injector tube. Typically, 25% of the air is electrochemically utilized (i.e., reacted) in the active fuel cell section. The air is electrochemically reduced as it passes over the inner air electrode along the inside active length of the fuel cell and is depleted in oxygen content as it approaches the opened end annular top of the fuel cell. Concurrently, fuel is directed to flow over the outside of the fuel cell from the bottom closed end to the top opened end in contact with the outer fuel electrode, being preheated to approximately 1,000° C. Typically, 85% of the fuel is electrochemically utilized (reacted) in the active fuel cell section. The fuel is electrochemically oxidized at the outer fuel electrode along the outside active length of the fuel cell and is depleted in fuel content as it approaches the opened end annular top of the fuel cell. The gas-impervious solid oxide electrolyte prevents the fuel from intermixing with the oxidant and also does not allow nitrogen to pass from the air side to the fuel side. Hence the fuel is oxidized in a nitrogen free environment, for averting the formation of $NO_x$. At the opened end of the cell, the remaining or spent fuel stream is reacted through combustion with the remaining or spent air stream exiting the cell in a combustion chamber located above the opened end of the fuel cells, thereby forming a combusted exhaust gas which provides additional useful heat for generator operations.

Reformation of natural gas and other fuels containing hydrocarbons can be accomplished, if desired, within the generator to precondition the fuel. Incoming fuel can be reformed to $H_2$ and CO within the generator, eliminating the need for an external reformer. All the gas flows and reactions are controlled within the generator apparatus. For a more complete description of tubular solid oxide fuel cells and their operation in a generator apparatus, reference can be made to U.S. Pat. No. 4,395,468 (Isenberg), which is hereby incorporated in its entirety.

To construct an electric solid oxide fuel cell generator, individual solid oxide fuel cell tubes are "bundled" into an array of series-parallel electrically connected fuel cells, forming a semi-rigid structure that is a basic generator building block. The individual bundles are coupled in series or parallel to sum their voltages or currents, respectively, thereby forming "submodules." The particular voltage level and current capacity employed depends on the application. Parallel electrical connection of the cells within a bundle enhances generator reliability. Submodules are further combined in either parallel or series connections to form the "generator module," otherwise known as the "fuel cell stack".

These constructions conventionally must be assembled from individual parts, normally within the generator container, which requires excessive handling of the fuel cells and the provision of extra space in the generator container to provide clearance for assembly, among other drawbacks as previously described. Such constructions become more unstable and less rigid as the fuel cell length increases, in particular when scaling up the device as a large multi-cell generator.

The submodules or generator modules are further complicated by being operationally connected either directly or indirectly to associated generator equipment. The associated equipment may include, for example, stack divider boards (e.g., as shown in U.S. Pat. Nos. 4,876,163 (Reichner) and 4,808,491 (Reichner)), stack reformer boards (e.g., as shown in U.S. Pat. No. 5,082,751 (Reichner)), oxidant supply and distribution tubing, fuel supply and distribution tubing, fuel distribution blocks, cell support blocks, porous and gas-tight generator walls, recirculation tubing, exhaust tubing, and combustion chambers (e.g., as shown in U.S. Pat. No. 4,395,468 (Isenberg)), and catalytic fuel reformer beds (e.g., as shown in U.S. Pat. No. 5,143,800 (George, et al.)). Conventionally in the past, each individual solid oxide fuel cell or submodule of the fuel cell stack has been individually handled, positioned, and assembled within the generator container by appropriate brackets, fittings, and connections, to these associated components which caused the problems described previously. The present invention avoids handling and structural problems associated with the fuel cell stack by providing a pre-assembled structurally self-supporting and removable fuel cell stack that can be easily assembled in the fuel cell generator and integrated with associated generator components.

Referring now to FIG. 1 of the drawings, one type of high temperature, solid oxide fuel cell generator 10 is shown together with a schematic of its workings. An exterior housing 12 surrounds the entire generator container 10. The exterior housing can comprise one or more thin sheets of high temperature resistant metal, such as iron, steel, stainless steel, nickel alloy, or concrete or other suitably durable material. Exterior thermal insulation 14 is contained within the exterior housing 12. The exterior insulation can be made of one or more layers of low density alumina, such as porous alumina fibers. The exterior insulation 14 surrounds at least the sides 16 of a generator compartment 18 (also referred to herein as fuel cell stack compartment) and will usually also cover the top 20 of the generator compartment. The generator compartment can be made of one or more thin sheets of high temperature resistant metal, such as iron, steel, stainless steel, nickel alloy or other suitable materials. Interior thermal insulation 22 is contained within the generator compartment 18. The interior insulation can be made of one or more layers of low density alumina. In this embodiment, the interior of the generator compartment 18 contains two fuel cell stacks 24, 26 which include a plurality of electrically connected tubular high temperature solid oxide fuel cells surrounded by the interior insulation. The fuel cell stack also can include associated power leads, feed oxidant supply and distribution tubing, feed fuel supply and distribution tubing, combustion compartments, and the like. According to the invention, the fuel cell stacks 24, 26 contained in the generator compartment 18 are designed to be easily removed from the exterior housing 12 and to form rigid unitary self-supporting structural members.

As shown, each fuel cell stack 24, 26 contains solid oxide fuel cell bundles 28, 30. Each bundle contains a plurality of electrically interconnected, preferably in a series-parallel rectangular array, axially elongated tubular solid oxide fuel cells 32. Each fuel cell has a porous exterior fuel electrode 34 (the electrode contacted by the fuel) covering its surface, a self-supporting porous interior air electrode 36 (the electrode contacted by oxidant, and a dense, gas-tight solid oxide electrolyte 38 covering the surface of the air electrode, except in a strip along the entire active length of the fuel cell. This strip of exposed air electrode is covered by a dense, gas-tight interconnection (not shown), at which an electric contacting area is provided for coupling the cell to an adjacent cell or power contact via a conductor. The interconnection is covered by a conductive top layer (not shown). The porous air electrode 36 is generally a strontium doped lanthanum chromite ceramic, the solid oxide electrolyte 34 is generally a yttria-stabilized zirconia ceramic, the fuel electrode 30 and top layer are generally both a nickel-zirconia cermet, and the interconnection is generally a doped lanthanum chromite ceramic. Reference can be made to U.S. Pat. Nos. 4,395,468 (Isenberg) and 4,490,444 (Isenberg) for a description of materials and construction of exemplary tubular solid oxide fuel cells.

An operating solid oxide fuel cell 32 at approximately 1,000° C. readily conducts oxygen ions from the air electrode 36 (or cathode), where they are formed from air or oxygen, shown as O, passing in contact with the air electrode, through the solid oxide electrolyte 38 to the fuel electrode 34 (or anode). There the oxygen ions react with carbon monoxide and hydrogen gases contained in the fuel gas, shown as F, to deliver electrons to the air electrode and to generate an electric potential to produce a flow of current in an external circuit (not shown). For operation, a gaseous oxidant, such as air, is fed through oxidant feed inlet 40 penetrating the exterior housing 12 and exterior insulation 14 and enters the oxidant feed tubing 42 where the oxidant passes through a combustion compartment 44 and into the generator compartment 18, being preheated from the latent heat produced during generator operations to a temperature of approximately 1,000° C. The oxidant is introduced into the fuel cells 32 generally through the oxidant feed tubing 42 extending down into the inside annular space within the fuel cells. The oxidant is discharged near the closed and bottom of the fuel cells, exits the tubing and reverses flow and passes in the annular space between the oxidant feed tubing and up along the inside active length of the fuel cells, where the oxidant electrochemically reacts at the inner air electrode 32, being depleted in oxygen content as it approaches and exits the open ends of the fuel cell. The depleted oxidant is then discharged into the combustion compartment 44 through the opened end top of the fuel cells as depleted or spent oxidant.

A gaseous hydrocarbon fuel, such as natural gas, is fed through feed fuel inlet 46 penetrating the exterior housing 12 and exterior insulation 14 and enters an ejector 48 where it mixes with hot depleted or spent fuel gas that was formed along the axial length of the outside of the fuel cells at the outer fuel electrode 34 and passed through a recirculation tubing 50 into the ejector. The mixed fuel stream, heated to approximately 1,000° C., provides a useful reformable mixture for fuel preconditioning. The reformable mixture passes through a reformer compartment 52 containing a reforming catalyst, such as nickel, and exits as carbon monoxide and hydrogen gases into a fuel plenum 54 and then passes through fuel tubing 56 into the generator compartment 18 and is fed at the closed end bottom of the fuel cells up over the outside of the fuel cells, wherein the fuel electrochemically reacts along the exterior fuel electrode surface along the active length of the fuel cells, depleting somewhat in fuel as it approaches the opened end top of the fuel cells. Part of the hot gaseous spent fuel is passed to the recirculation tubing 50 and the rest passes from the generator compartment through a porous wall 58 and enters the combustion compartment 44 to combine and combust with the spent oxidant to provide a hot exhaust gas which may exit the generator through exhaust tubing 60. Through the electrochemical reactions occurring at the fuel electrode and air electrode of the fuel cells, a continuous flow of oxygen ions and electrons is generated in an external circuit (not shown) to produce useful electricity. For a more detailed discussion of the workings of a solid oxide fuel cell generator, reference can be made to U.S. Pat. Nos. 5,169,730 (Reichner) and 5,143,800 (George), which are hereby incorporated in their entireties.

The present invention resides in placing the solid oxide fuel cells on a common structural base forming a preassembled removable modular fuel cell stack. The removable modular fuel cell stack as a unitary assembly can easily be installed and removed from the solid oxide fuel cell generator housing. The solid oxide fuel cell generator apparatus includes space in the generator compartment capable of receiving this removable modular fuel cell stack. This generator compartment is sized to provide clearance for inserting the removable modular fuel cell stack. Preferably, this clearance is three inches on each side of the removable modular stack. Before installation of the removable modular stack, a layer of interior insulation may preferably be installed in the inside base of the modular solid oxide fuel cell generator container stack compartment. The removable modular stack may then be installed on top of this layer of interior insulation. After installation, bulk interior insulation is placed into the gap between the removable modular stack and the inside surface of the generator compartment. Certain equipment associated with solid oxide fuel cell generators, for example, combustion chambers, reformers, recirculation channels, exhaust channels, oxidant and fuel piping, etc., may be included in the removable modular stack or it may be provided as an appliance included as part of the solid oxide fuel cell generator container. Additionally, the common stack base can include the fuel plenum formed in base in addition to being a structural foundation for the components of the removable modular fuel cell stack. Alternatively, this plenum in the base can function as an oxidant plenum.

Figure 2:
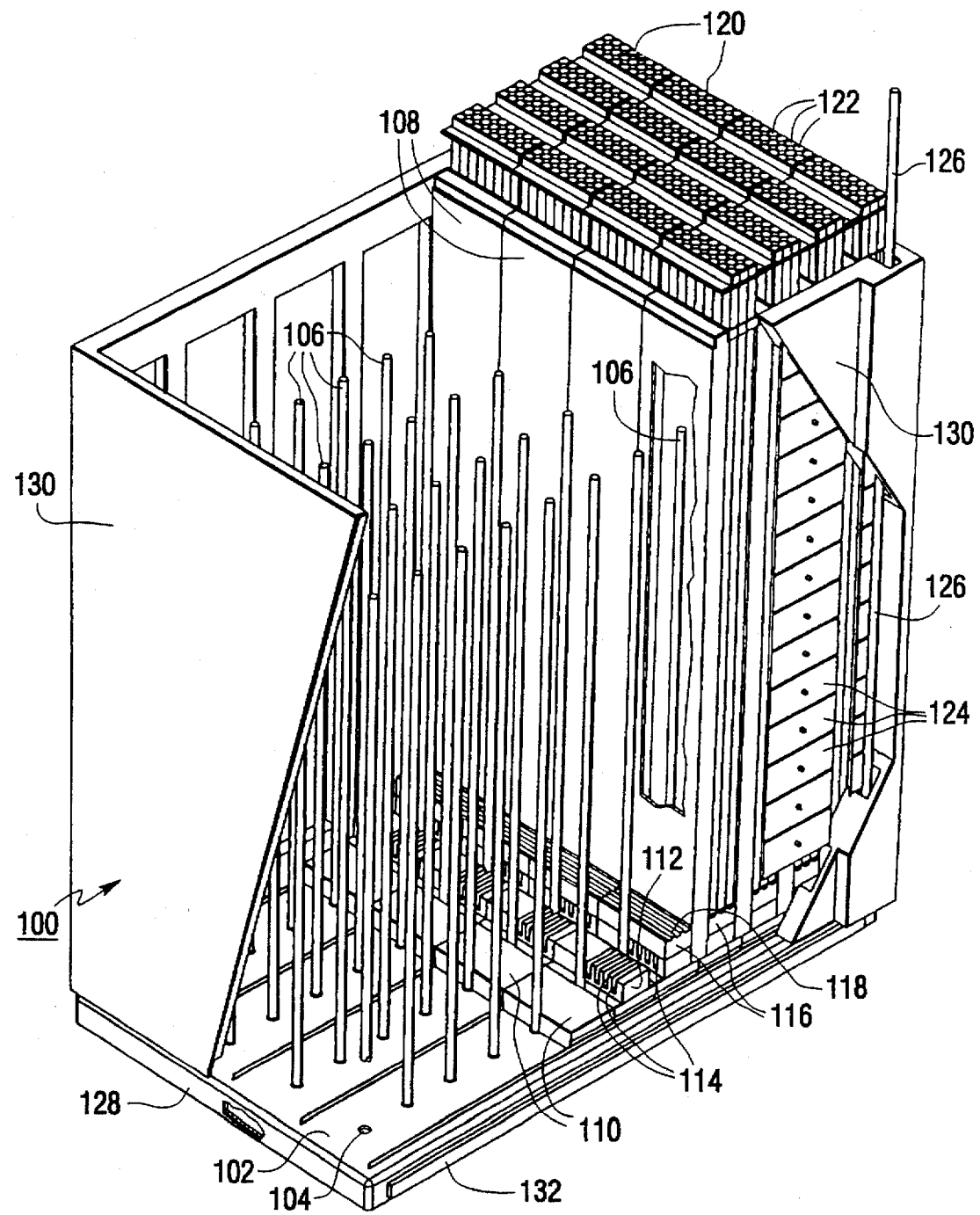
FIG. 2 is a cutaway view of a partially assembled rectangular removable modular fuel cell stack of the invention.

Now to further clarify and illustrate the present invention, some specific embodiments of the removable modular solid oxide fuel cell stack of the invention will be discussed by way of non-limiting examples. Referring now to FIG. 2 of the drawings, a cutaway view of a partially assembled rectangular removable modular stack (RMS) 100 is shown. The generally rectangular shape of the stack base would make the RMS particularly useful for incorporation into an atmospheric SOFC generator 200 like that shown in FIG. 3. Also, referring now to FIGS. 4 and 5 of the drawings, a cutaway view of a partially assembled circular RMS 300 is shown. A fully assembled circular RMS 300 is shown in FIG. 6. The generally circular shape of the stack base would make the RMS particularly useful for incorporation into a pressurized SOFC generator 400 like that shown in FIGS. 7 and 8. In either configuration, the RMS would contain a plurality of fuel cells which could be of various configurations, for example, flat, corrugated, or tubular utilizing a variety of electrolytes operable at relatively high temperatures, for example, a phosphoric acid matrix or a solid oxide ceramic, disposed between electrodes, such as air electrodes (the electrode contacted by oxidant such as air) and fuel electrodes (the electrode contacted by fuel, such as reformed coal gas or reformed natural gas). The fuel cells would have associated interconnections and power leads, feed oxidant supply and distribution tubing, feed fuel supply and distribution tubing, and the like.

Referring again to FIG. 2 of the drawings, a partially assembled rectangular removable modular fuel cell stack 100 is shown. The removable modular fuel cell stack contains a horizontally extending generally rectangular fuel cell stack base 102. The stack base is preferably made of stainless steel or other high temperature resistant metals or ceramics. The stack base 102 includes apertures 104 through the base 102. As shown, the apertures 104 are spaced apart from each other and arrayed in columns and rows to accommodate the desired arrangement of fuel cells within the fuel cell stack. Positioned over the apertures and vertically extending upward in the inside of the fuel cell stack are fuel riser tubes 106. Positioned over each fuel riser tube 106 is a fuel cell stack divider board or reformer board 108. In this embodiment, stack reformer boards 108 are shown which are positioned between each fuel cell bundle and serve two main functions, which are as an internal fuel reformer and a structural support for the fuel cell stack. The stack reformer boards 108 vertically extend upwards in the fuel cell stack, preferably along the entire active length of the fuel cells. Stack reformer or divider boards 108 are preferably made of low density alumina. The stack reformer or divider boards 108 have a hollowed central interior channel (not shown) and for the stack reformer boards, this hollow cavity is impregnated with catalytic nickel or platinum reforming material along its length.

The fuel riser tubes 106 are positioned within the hollow divider boards to facilitate the introduction of fuel into the hollow cavity of the stack reformer boards 108 near the top closed end of the boards. This allows the fuel to flow up through the fuel riser tubes, exit the fuel riser tube near the top of the interior channel, and then reverse direction and flow down the interior channel in the axial space between the fuel riser tube and the walls of the interior cavity, contacting the catalytic reforming material as it exits the stack reformer board at the open ended bottom before coming into contact with the fuel electrodes of the solid oxide fuel cells. For a more complete description of the use of stack divider boards or stack reformer boards in the fuel cell stack, reference can be made to U.S. Pat. No. 5,082,751 (Reichner), hereby incorporated in its entirety.

Interior insulation blocks 110 are positioned on the stack base 102 between adjacent spaced apart fuel riser tubes 106. The interior insulation blocks 110 are preferably made of low density alumina boards and provide complete thermal insulation coverage over the stack base. As shown in the drawings, the interior insulation blocks 110 include a plurality of generally rectangular blocks aligned one next to the other to form columns and rows extending across the entire width and length of the stack base. Set on the insulation blocks 110 are fuel distribution blocks 112. The fuel distribution blocks are preferably made of alumina boards. Each fuel distribution block contains a plurality of fuel inlet channels 114 in flow communication with the exit channel of the stack reformer boards 108. The fuel inlet channels 114 allow passage of the reformed fuel that exits the bottom opened end of the stack reformer boards 108 over the exterior fuel electrode of the fuel cells.

Fuel cell support blocks 116 are positioned over the fuel distribution blocks 112. Fuel cell support blocks are preferably made of low density alumina boards. Each fuel cell support block 116 contains fuel inlet channels 118 for passage of the fuel from the fuel distribution blocks 112 to the fuel cells. Fuel cell bundles 120 are set on cell support blocks 116. Each bundle 120 contains a plurality of parallel, spaced apart, axially elongated, preferably along the entire length of the fuel cell stack, tubular high temperature, solid oxide fuel cells 122. Each fuel cell 122 has an exterior fuel electrode (not shown) covering its surface, an interior air electrode (not shown) and a solid oxide electrolyte (not shown) between the electrodes, as is well known in the art. The fuel electrode can be made of a porous cermet material, such as nickel-zirconia cermet, the air electrode can be made of a porous doped ceramic material, such as doped lanthanum manganite, and the solid electrolyte can be made of a dense, gas-tight, ceramic material, such as yttria-stabilized zirconia, as is well known in the art. Each fuel cell 122 is preferably series-parallel connected to adjacent fuel cells in the bundle 120, via fuel cell interconnections (not shown) and metal felts (not shown), and the bundles are preferably further series-parallel connected to each other by series plates 124 and by terminal bars 126 to an external circuit (not shown), as is well known in the art.

Each fuel cell 122 in the bundle 120 rests at its bottom closed end on the cell support blocks 116 in flow communication with the fuel inlet channels 118 in the cell support blocks. In this manner, the reformed fuel passing through the fuel distribution ports 114 can further pass through the fuel inlet channels 118 and flow upward over the exterior of the fuel cells 122 in the cell bundles 120 in contact with the exterior fuel electrode. As shown, the fuel cell bundles 120 are grouped into columns and rows within the fuel cell stack. The columns of the fuel cell bundles are separated from one another by the stack reformer boards 108. Each fuel cell is further provided in flow communication with oxidant riser tubes (not shown) which extend within the opened end top of the fuel cells and allow oxidant to pass in the annular interior of the fuel cells in contact with the interior air electrode, as is well known in the art.

As further shown in FIG. 2, the stack base 102 contains a fuel plenum 128 extending with the hollow cavity of the base. The fuel plenum 128 provides a channel for flow communication between the fresh feed fuel and the fuel cells in the cell bundles. While in some embodiments, the fuel plenum may be provided as a separate structure, the common stack base of the removable modular stack provides a convenient location for positioning of the fuel plenum. The fuel riser tubes 106 are mounted to the stack base 102 so that they are in fluid flow communication with the fuel plenum 128 incorporated into the stack base 102. Furthermore, an outer housing 130 is mounted to the stack base 102 and vertically extends upward and generally surrounds the assembled removable modular stack, thus forming enclosing side walls. The outer housing is preferably made of high purity and high density alumina boards. The self-enclosed modular fuel cell stack container 100 can then be positioned within the solid oxide fuel cell generator apparatus within the generator stack compartment. Also, attached to the stack base 102 is a lifting rail 132 extending along the length of the base, preferably on both sides thereof, to facilitate installation of the rectangular removable modular stack in the generator stack compartment to form an atmospheric high temperature, solid oxide fuel cell generator like that shown in FIG. 3.

Figure 3:
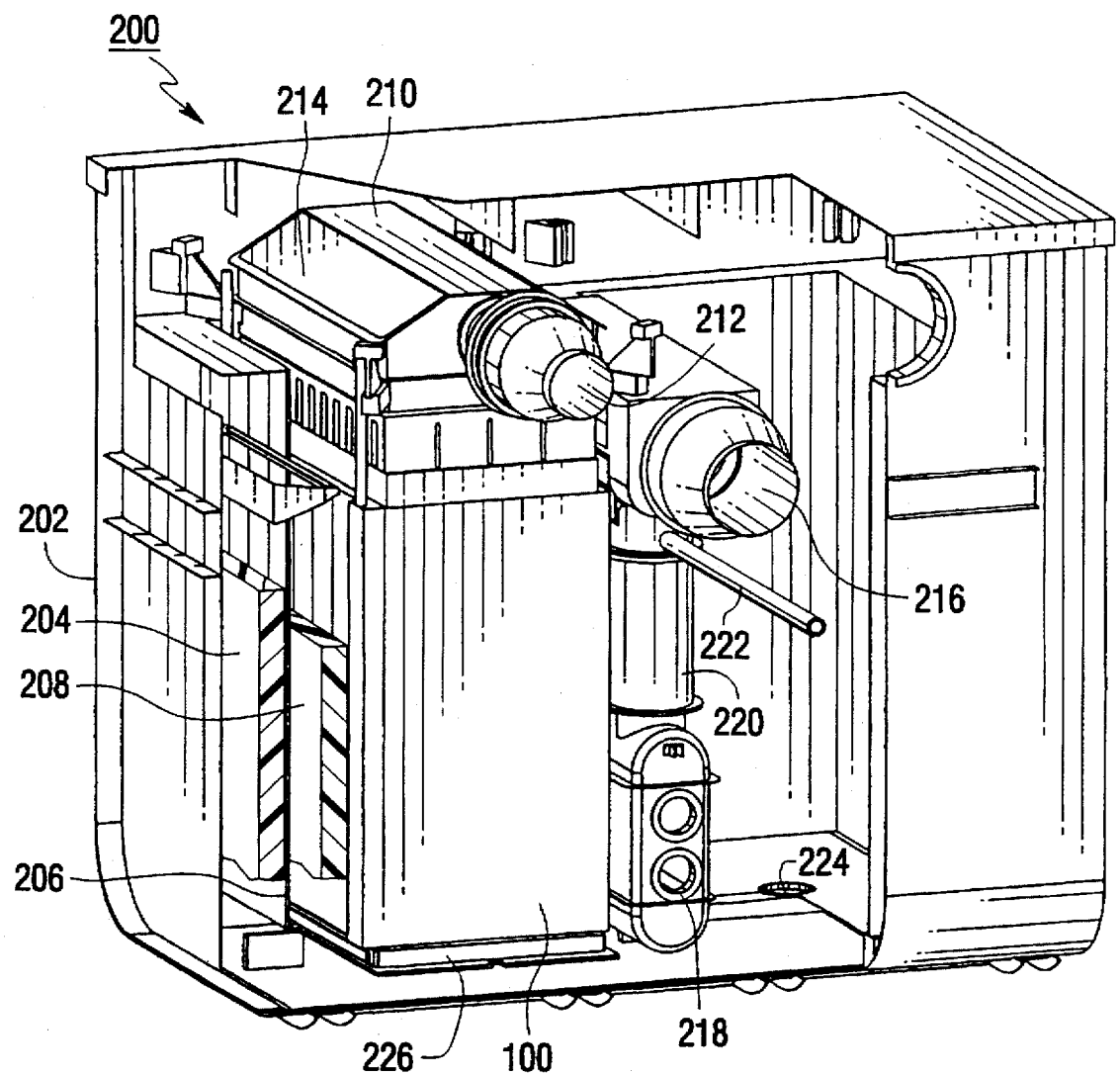
FIG. 3 is a cutaway view of an atmospheric generator container designed to accommodate two rectangular removable modular fuel cell stacks as shown in FIG. 2.

Referring now to FIG. 3, an atmospheric solid oxide fuel cell generator 200 is shown. As shown in FIG. 3, the atmospheric generator 200 contains two rectangular preassembled removable modular stacks 100 of the type shown in FIG. 2 (only one removable modular stack is shown for clarity), which are positioned within the exterior generator housing 202 that is surrounded by exterior thermal insulation 204. In the generator housing is a stack compartment 206 which houses the removable modular stacks 100. Interior insulation 208 surrounds each removable modular fuel cell stack 100. The removable modular stacks 100 are shown in FIG. 3 as also including an oxidant distribution assembly 210 positioned on the top of the fuel cell bundles which includes an oxidant inlet channel 212, an oxidant plenum 214 attached to the oxidant inlet channel 212, oxidant riser tubes (not shown) attached to the oxidant plenum 214 and extending into the interior of the fuel cells, a combustion chamber (not shown), an exhaust channel (not shown) attached between the combustion chamber and exhaust port 216 to the atmosphere, and a recirculation channel (not shown) attached between the fuel cell stack and ejector 220, as is well known in the art. Also shown in the generator of FIG. 3, is a centrally located reformer chamber 218 which includes an ejector 220 that combines fresh feed fuel from a fresh feed fuel inlet 222 with spent fuel from a recirculation channel (not shown) and sends this reformable fuel mixture into the reformer 218 containing a reformer catalyst bed. The reformer exit connects to a stack fuel delivery channel 224 through the stack base which is in flow communication with the fuel plenum 226 in the stack base to provide a supply of gaseous fuel to the removable modular fuel cell stack 100. As shown in FIG. 3, the reformer 218 is not provided within the removable modular stack. However, other embodiments of the removable modular stack as discussed below do include the reformer within the stack.

Figure 4:
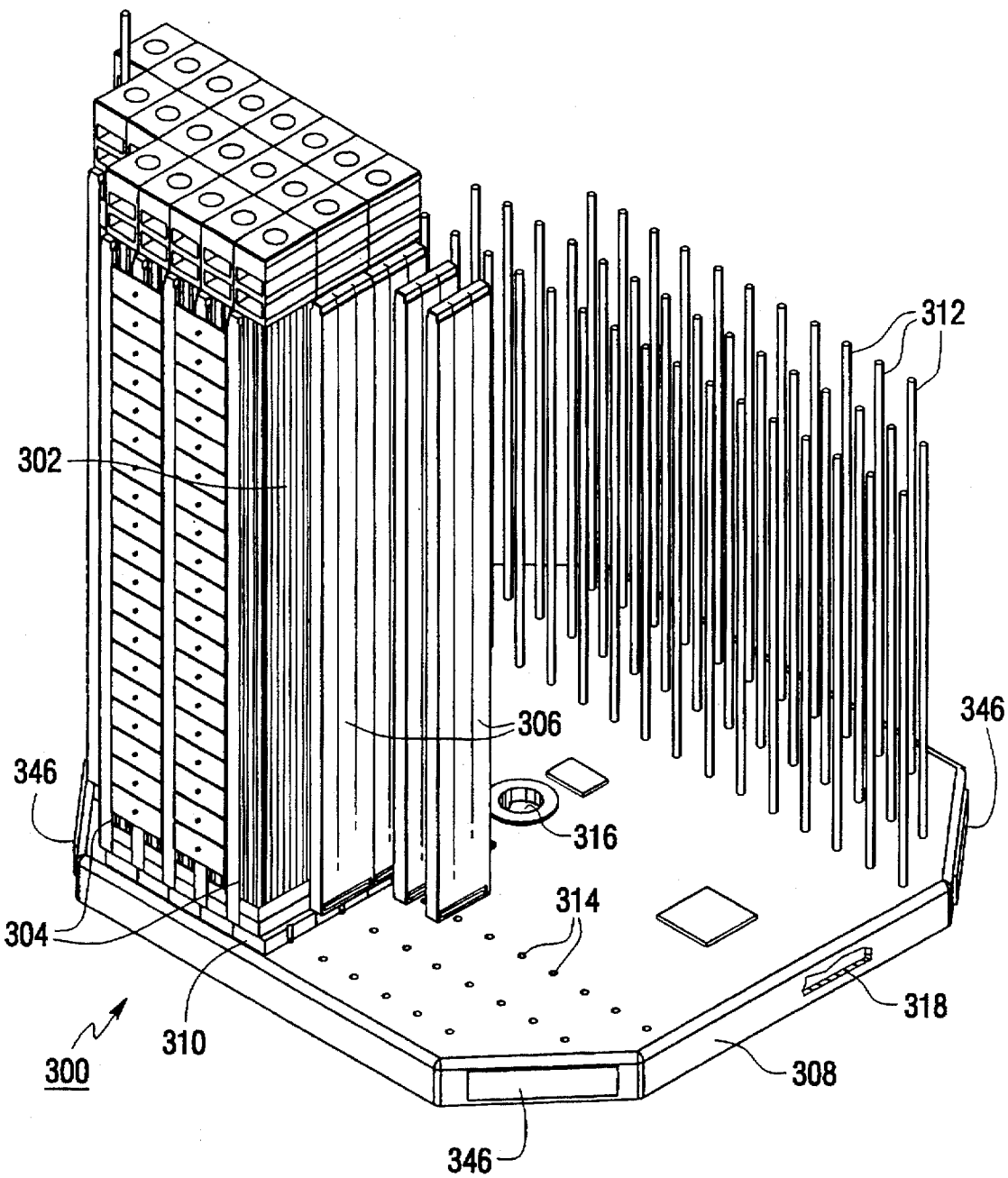
FIG. 4 is a side view of a partially assembled circular removable modular fuel cell stack of the invention.
Figure 5:
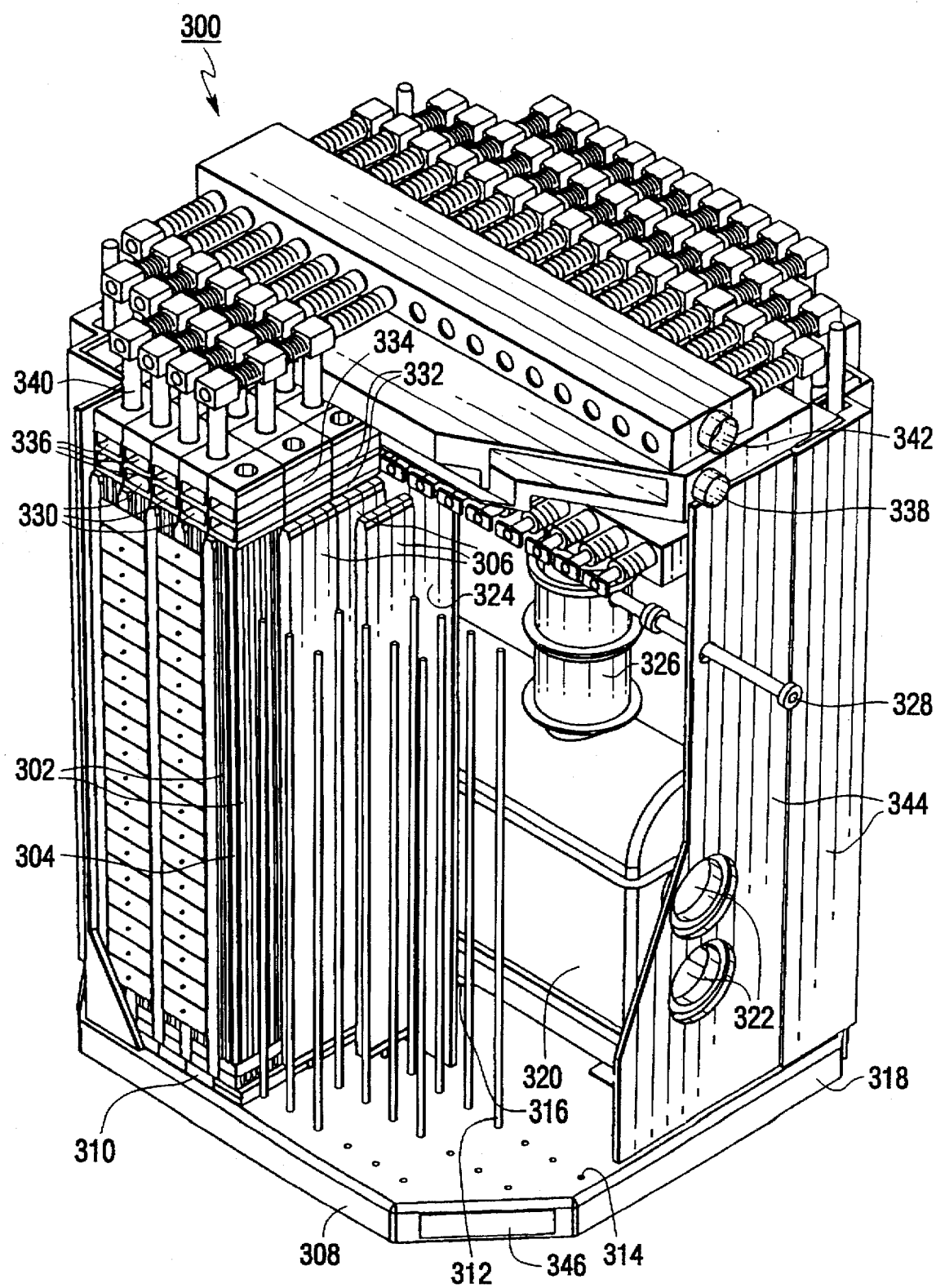
FIG. 5 is a cutaway view of a more fully assembled circular removable modular fuel cell stack shown in FIG. 4.
Figure 6:
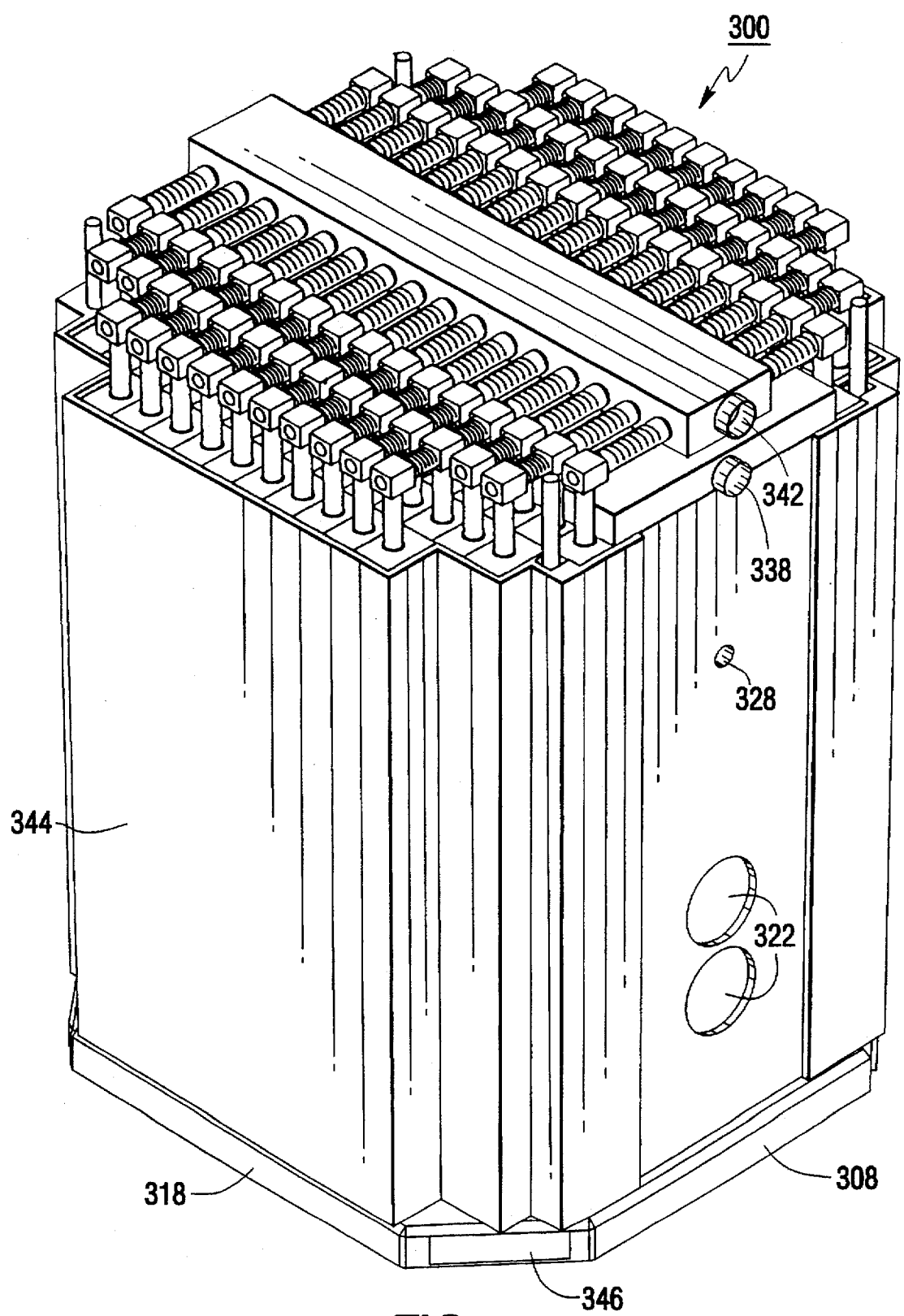
FIG. 6 is a side view of a fully assembled circular removable modular fuel cell stack shown in FIG. 5.

Referring now to FIGS. 4 and 5, two cutaway views of partially assembled generally circular removable modular stack (RMS) 300 are shown. The tubular, axially elongated, series-parallel electrically connected, high temperature, solid oxide fuel cells 302 of the type described above are arranged in cell bundles 304 to form an integrated bundle assembly. The cell bundles 304 are separated by stack reformer boards 306 which extend upwardly, preferably the entire active length of the fuel cell bundles, from the stack base 308. The stack reformer boards 306 are mounted on interior insulation blocks 310 and positioned over vertically extending fuel riser tubes 312 mounted in apertures 314 extending through the stack base 308. As described previously, the fuel riser tubes extend into cavities in the stack reformer boards and allow the fuel to contact the catalyst impregnated interior walls of the stack reformer boards prior to contacting the fuel cells. A fuel entry port 316 is located in the center of the stack base which includes a large bore extending through the stack base and is in flow communication with the fuel plenum 318 that is formed in the stack base. Mounted on top of and in flow communication with the fuel entry port is the exit channel of a reformer 320 containing a reforming catalyst bed that can easily be replaced when spent through catalyst replacement ports 322 as shown in FIG. 5. In this embodiment, the reformer 320 is located directly within the removable modular fuel cell stack 300. As also shown, the reformer is located in a separate compartment than the fuel cell bundles, being separated from the fuel cell bundles by interior wall 324 interposed between the fuel cell bundles 304 and the reformer 320. Mounted on top of and in flow communication with the reformer inlet is an ejector 326 which takes a mixture of fresh feed fuel from the fresh fuel inlet channel 328, combines it with a portion of the spent fuel contained in recirculation channel 330, and causes this reformable fuel mixture to flow into the reformer for reformation into carbon monoxide and hydrogen gases.

Positioned on top of the fuel cell bundles near the open ends of the fuel cells are porous barriers 332. The porous barriers are generally horizontal sheets preferably made of alumina boards and are spaced apart by generally vertical partitions also preferably made of alumina boards. The porous barriers are designed to allow a portion of the spent fuel gas flow from the stack compartment through the recirculation channel 330 and combine with the fresh feed fuel at the ejector 326. The porous barriers are further designed to allow the remaining portion of the spent fuel to pass from the stack compartment through the porous barrier into a combustion chamber 334 and combine with spent oxidant forming exhaust gas which exits through the exhaust channel 336 to the atmosphere through exhaust outlet 338. Oxidant channels 340 extend from a fresh oxidant inlet 342 through the combustion chamber 334 and terminate into oxidant riser tubes (not shown) which extend down the interior length of each of the fuel cells and cause the oxidant to be released near the closed end bottom of the fuel cells in contact with the interior air electrode. Outer walls 344 are mounted to the stack base and generally surround the removable modular stack. The outer walls are preferably made of alumina boards. FIG. 6 shows a perspective view of the assembled removable modular fuel cell stack 300 of FIGS. 4 and 5.

Figure 7:
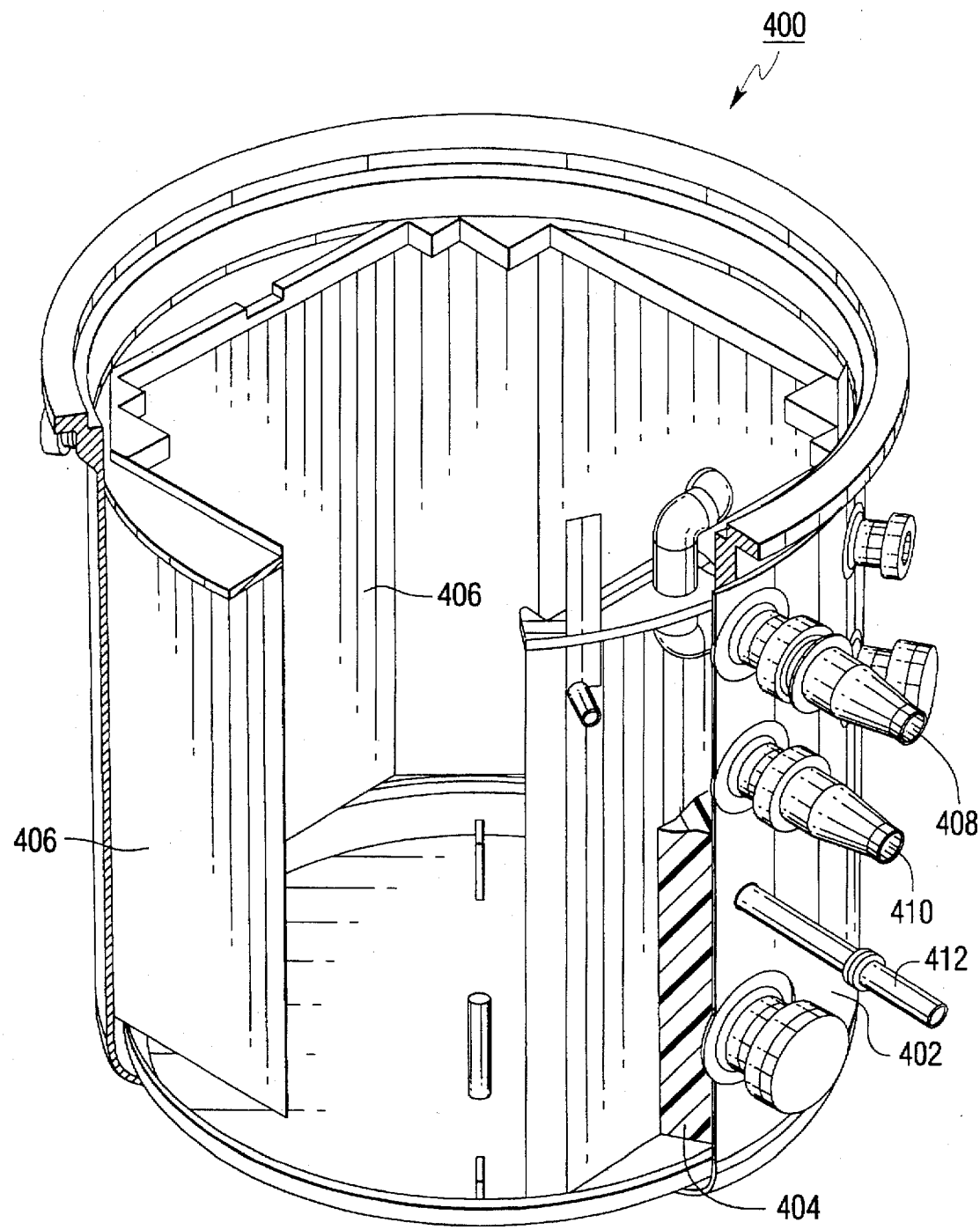
FIG. 7 is a cutaway view of a pressurized generator container designed to accommodate a circular removable modular fuel cell stack shown in FIG. 6; and, FIG. 8 is a cutaway view of the pressurized generator container shown in FIG. 7 containing a circular removable modular fuel cell stack shown in FIG. 6.
Figure 8:
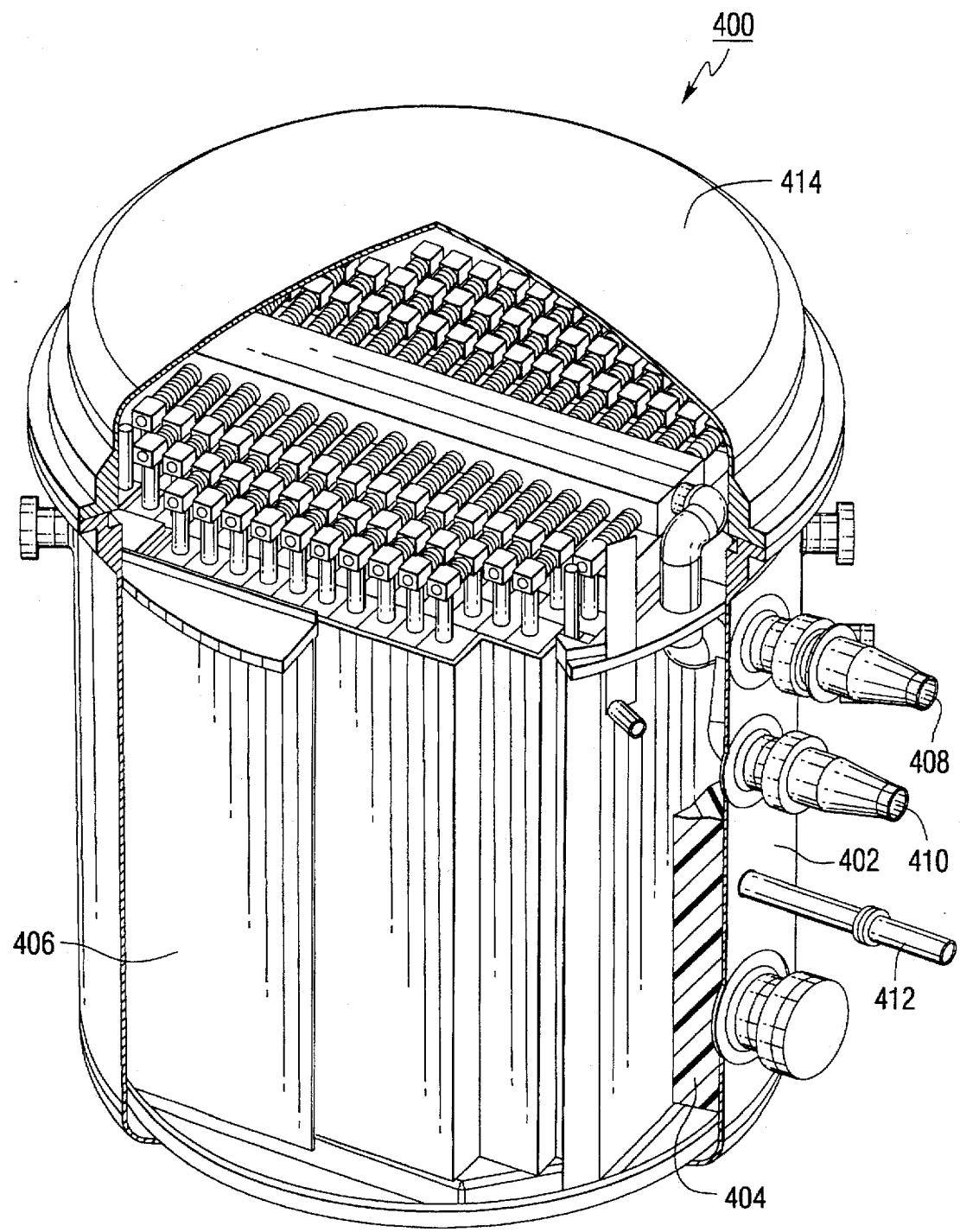

The circular shape of the stack base 308 makes RMS 300 particularly useful for incorporation into a pressurized SOFC generator 400 such as that shown in FIGS. 7 and 8. The stack base further contains lifting handles 346 on at least two sides to facilitate placement of the pre-assembled RMS 300 into the generator apparatus 400. Referring now to FIG. 7, the pressurized SOFC generator 400 includes an exterior housing 402. The exterior housing is preferably generally cylindrical and preferably made of stainless steel. Surrounding the inside of the exterior housing is thermal exterior insulation 404. A generator container 406 is positioned inside the exterior insulation which is configured to fit the removable modular stack 300 of FIGS. 4-6 within its container side walls. The exterior housing also contains a fresh oxidant inlet port 408, an exhaust port 410, and a fresh fuel inlet port 412, all penetrating the exterior housing and exterior insulation and connecting to their respective flow channels in the removable modular stack. After the removable modular stack is installed in the generator housing 406 as shown in FIG. 8, a pressure lid 414 covers the top of the exterior housing 402 and seals the generator apparatus to seal in the generator equipment for operation at pressures greater than atmospheric.

Since numerous changes may be made in the disclosed apparatus without departing from the spirit and scope thereof, it is intended that the material contained in the foregoing description and drawings be interpreted as illustrative and not in a limiting sense.

We claim:

1. A fuel cell generator apparatus, comprising: a pre-assembled self-supporting removable modular fuel cell stack comprising:

a generally planar base;

a fuel cell stack mounted on said base; and an outer fuel cellstack housing connected to said base and extending upwardly from the sides thereof defining a chamber generally enclosing the sides of said fuel cell stack, where the fuel cell stack comprises;

a plurality of electrically interconnected elongated tubular solid oxide fuel cells mounted to said base, each fuel cell having an air electrode, a fuel electrode, and an electrolyte disposed between the two electrodes;

an oxidant distribution channel connected to said fuel cells in fluid flow communication with said air electrodes of said fuel cells for transferring oxidant to said air electrodes; and, a fuel distribution channel connected to said fuel cells in fluid flow communication with said fuel electrodes of said fuel cells for transferring fuel to said fuel electrodes; and, a fuel cell generator container comprising an outer generator housing containing at least one fuel cell stack compartment within said outer generator housing for receiving said pre-assembled self-supporting removable modular fuel cell stack.

2. The fuel cell generator apparatus of claim 1, in which the fuel cell stack further comprises:

a fuel plenum connected in fluid flow communication to said fuel distribution channel; and, a fresh fuel inlet channel connected in fluid flow communication to said fuel plenum.

3. The fuel cell generator apparatus of claim 2, in which the fuel cell stack further comprises:

an oxidant plenum connected in fluid flow communication to said oxidant distribution channel; and, a fresh oxidant inlet channel connected in fluid flow communication to said oxidant plenum.

4. The fuel cell generator apparatus of claim 3, in which the fuel cell stack further comprises:

a fuel reformer mounted to said base and connected in fluid flow communication between said fresh fuel inlet channel and said fuel plenum.

5. The fuel cell generator apparatus of claim 3, in which the fuel cell generator further comprises:

a fuel reformer disposed in a reformer compartment in the generator housing outside of the fuel cell stack compartment and connected in fluid flow communication between said fresh fuel inlet channel and said fuel plenum.

6. The fuel cell generator apparatus of claim 3, in which the fuel cell stack further comprises:

a combustion chamber connected in fluid flow communication to said fuel cells for combusting a first portion of a spent fuel with a spent oxidant, both exiting the fuel cells;

an exhaust channel connected in fluid flow communication to said combustion chamber for transferring a combusted gas generated in the combustion chamber to outside the generator apparatus; and, a recirculation channel connected to said fuel cells and in fluid flow communication between said fuel cells and said fresh fuel inlet channel for recirculating a second portion of a spent fuel exiting the fuel cells to combine with fresh feed fuel.

7. The fuel cell generator apparatus of claim 3, in which the oxidant plenum is mounted on top of the fuel cell stack housing.

8. The fuel cell generator apparatus of claim 3, in which the fuel plenum is disposed in an internal cavity within said base and in fluid flow communication between the fresh fuel inlet channel and fuel distribution channel.

9. The fuel cell generator apparatus of claim 1, in which the fuel cell generator container has two or more fuel cell stack compartments for receiving two or more pre-assembled self-supporting removable modular fuel cell stacks.

10. The fuel cell generator apparatus of claim 1, in which said base of said fuel cell stack has an internal cavity with a plenum having an inlet and outlet disposed therein.

11. The fuel cell generator apparatus of claim 1, in which said base includes lifting means for lifting and positioning said pre-assembled self-supporting removable modular fuel cell stack into the stack compartment of the generator.

12. The fuel cell generator apparatus of claim 11, in which said base contains elongated lifting rails or slots mounted to one or more sides or ends thereof.

13. The fuel cell generator of claim 1, in which the fuel cell generator container is a pressure vessel designed to operate with internal pressures in excess of atmospheric pressure.

14. The fuel cell generator apparatus of claim 1, in which the fuel cells are grouped into a plurality of cell bundles which are grouped into columns and rows in the fuel cell stack.

15. A solid oxide fuel cell generator apparatus, comprising:
- a solid oxide fuel cell generator container comprising a generator housing containing at least one solid oxide fuel cell stack compartment within said housing for receiving a pre-assembled self-supporting removable modular fuel cell stack assembly; and,
- a pre-assembled self-supporting removable modular solid oxide fuel cell stack assembly positioned within said solid oxide fuel cell stack compartment, in which said pre-assembled self-supporting removable modular solid oxide fuel cell stack assembly comprises:
- a generally planar base having a hollow internal cavity defining a fuel plenum and a top surface containing a fuel plenum inlet in fluid flow communication with a fuel gas supply and a plurality of fuel plenum outlets;
- a fuel cell stack housing connected to the base and extending upwardly from the sides of the base defining a chamber generally enclosing the base;
- a plurality of fuel riser tubes, each fuel riser tube individually connected in fluid flow communication to an individual fuel plenum outlet, and extending upwardly from said top surface of said base;
- a plurality of columns and rows of fuel cell stack reformer boards, each fuel cell stack reformer board individually mounted to the top surface of said base and extending over an individual fuel riser tube, in which each fuel cell stack reformer board contains an internal channel with reformer catalyst in fluid flow communication with said fuel riser tube extending therein;
- a plurality of rows and columns of electrically interconnected elongated tubular solid oxide fuel cells, each row comprising a column of solid oxide fuel cells being spaced between neighboring columns of the fuel cell stack reformer boards, each solid oxide fuel cell being individually mounted to the top surface of the base and extending upwardly from said base, and each solid oxide fuel cell tube having an inner air electrode connected in fluid flow communication to an oxidant gas supply, an outer fuel electrode connected in fluid flow communication to the stack reformer board and a solid oxide electrolyte sandwiched in between the two electrodes.

16. The solid oxide fuel cell generator apparatus of claim 15, in which the solid oxide fuel cell stack further comprises:
- a fresh fuel inlet channel connected in fluid flow communication to said fuel plenum inlet.

17. The solid oxide fuel cell generator apparatus of claim 16, in which the solid oxide fuel cell stack further comprises:
- an oxidant plenum mounted on top of said fuel cell stack housing, said oxidant plenum including an oxidant plenum inlet connected in fluid flow communication to the oxidant gas supply and an oxidant plenum outlet connected in fluid flow communication to said air electrodes; and,
- a fresh oxidant inlet channel connected in fluid flow communication to said oxidant plenum inlet.

18. The solid oxide fuel cell generator apparatus of claim 17, in which the solid oxide fuel cell stack further comprises:
- a combustion chamber mounted underneath said oxidant plenum and in fluid flow communication with said fuel cells for combusting a first portion of a spent fuel gas with a spent oxidant gas, both gases exiting the fuel cells;
- an exhaust channel connected in fluid flow communication to said combustion chamber for transferring a combusted gas as exhaust to outside the generator apparatus; and,
- a recirculation channel connected in fluid flow communication between said fuel cells and said fresh fuel inlet channel for recirculating a second portion of a spent fuel gas exiting the fuel cells back to the fuel electrodes of the fuel cells together with fresh fuel gas.

19. The solid oxide fuel cell generator apparatus of claim 18, in which the solid oxide fuel cell stack further comprises:
- a fuel reformer mounted to said base and connected in fluid flow communication between the fresh fuel inlet and the fuel plenum inlet.

20. The solid oxide fuel cell generator apparatus of claim 15, in which the fuel cell stack housing is a metal housing lined with thermal insulation.

21. The solid oxide fuel cell generator apparatus of claim 15, in which each air electrode is a porous layer of strontium doped lanthanum manganite ceramic material, each fuel electrode is a porous layer of nickel-zirconia cermet material, and each solid oxide electrolyte is a gas-tight layer of yttria stabilized zirconia ceramic material.

22. The solid oxide fuel cell generator apparatus of claim 21, in which the fresh fuel gas supply is natural gas and the fresh oxidant gas supply is air.

23. A fuel cell generator apparatus, comprising:
- a fuel cell generator pressure vessel designed to operate with internal pressures in excess of atmospheric pressure, comprising an outer generator housing containing at least one fuel cell stack compartment within said outer generator housing for receiving a pre-assembled self-supporting removable modular fuel cell stack assembly; and
- a pre-assembled self-supporting removable modular fuel cell stack assembly positioned within said fuel cell stack compartment, where said fuel cell stack assembly comprises a generally planar base, a fuel cell stack mounted on said base, and an outer fuel cell stack housing connected to said base and extending upwardly from the sides thereof, defining a chamber generally enclosing the sides of said fuel cell stack, where said fuel cell stack comprises:

a plurality of electrically interconnected elongated tubular solid oxide fuel cells mounted to said base, each fuel cell having an air electrode, a fuel electrode, and an electrolyte disposed between the two electrodes;

an oxidant distribution channel connected to said fuel cells in fluid flow communication with said air electrodes of said fuel cells for transferring oxidant to said air electrodes; and, a fuel distribution channel connected to said fuel cells in fluid flow communication with said fuel electrodes of said fuel cells for transferring fuel to said fuel electrodes.

* * * * *